United States Patent
Weis et al.

(10) Patent No.: US 9,871,653 B2
(45) Date of Patent: Jan. 16, 2018

(54) SYSTEM FOR CRYPTOGRAPHIC KEY SHARING AMONG NETWORKED KEY SERVERS

(71) Applicant: Cisco Technology, Inc., San Jose, CA (US)

(72) Inventors: Brian Eliot Weis, San Jose, CA (US); Maik Guenter Seewald, Nuremberg (DE); Ruben Gerald Lobo, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1063 days.

(21) Appl. No.: 13/945,369

(22) Filed: Jul. 18, 2013

(65) Prior Publication Data

US 2017/0359323 A1 Dec. 14, 2017

(51) Int. Cl.
H04L 29/06 (2006.01)
H04L 9/08 (2006.01)

(52) U.S. Cl.
CPC .............. H04L 9/08 (2013.01); H04L 63/062 (2013.01)

(58) Field of Classification Search
None
See application file for complete search history.

(56) References Cited

U.S. PATENT DOCUMENTS

| 6,785,809 B1 * | 8/2004 | Hardjono | H04L 9/0822 380/273 |
| 7,024,553 B1 * | 4/2006 | Morimoto | H04L 9/083 380/273 |
| 7,181,014 B1 * | 2/2007 | Srivastava | H04L 9/0833 380/278 |
| 7,824,262 B2 | 11/2010 | Weis | |

(Continued)

FOREIGN PATENT DOCUMENTS

WO 2005062951 A2 7/2005

OTHER PUBLICATIONS

Adelsbach et al., Key-Assignment Strategies for CPPM, ACM, © 2004, 9 pages.*

(Continued)

*Primary Examiner* — Jeffrey Pwu
*Assistant Examiner* — Baotram Tran
(74) *Attorney, Agent, or Firm* — Edell, Shapiro & Finnan, LLC

(57) ABSTRACT

A technique for key sharing among multiple key servers connected to one another over a communication network is provided herein. Each key sever of the multiple key servers stores respective cryptographic keys, and provides the keys to a local device group connected with the key server, to enable the device group to encrypt messages with the keys. Each key server acts as a proxy for the other key servers in order to receive other keys from the other key servers over the network, and provide the other keys to the device group for use to decrypt messages received from other local device (Continued)

groups respectively connected with the other key servers that were encrypted with the other keys and to check message integrity. The multiple key servers may share keys with each other directly, or alternatively, indirectly through a central key server, as needed to support secure communications between their respective device groups.

18 Claims, 8 Drawing Sheets

(56) References Cited

U.S. PATENT DOCUMENTS

| | | | | |
|---|---|---|---|---|
| 8,266,286 | B2* | 9/2012 | Kamarthy | H04L 63/065 380/277 |
| 8,295,490 | B1* | 10/2012 | McCoy | H04L 9/0894 380/279 |
| 8,396,805 | B2* | 3/2013 | Adachi | G06F 21/10 705/58 |
| 8,442,230 | B1* | 5/2013 | Ng | H04L 43/10 380/260 |
| 2002/0029199 | A1* | 3/2002 | Go | H04L 63/04 705/51 |
| 2005/0198170 | A1* | 9/2005 | LeMay | H04L 63/045 709/206 |
| 2007/0098176 | A1* | 5/2007 | Song | H04L 63/0823 380/279 |
| 2007/0257813 | A1* | 11/2007 | Vaswani | G01D 4/004 340/870.02 |
| 2007/0260548 | A1* | 11/2007 | Farrugia | G06F 21/10 705/59 |
| 2007/0288386 | A1* | 12/2007 | Adachi | G06F 21/10 705/58 |
| 2008/0016550 | A1* | 1/2008 | McAlister | H04L 63/105 726/1 |
| 2008/0065882 | A1* | 3/2008 | Goodman | G06F 21/6218 713/165 |
| 2008/0307054 | A1* | 12/2008 | Kamarthy | H04L 63/065 709/206 |
| 2008/0320303 | A1* | 12/2008 | Khalid | H04L 9/0833 713/163 |
| 2009/0028339 | A1* | 1/2009 | Goodman | G06F 21/80 380/278 |
| 2009/0222514 | A1* | 9/2009 | Igarashi | H04L 12/2809 709/203 |
| 2009/0282244 | A1* | 11/2009 | Brown | G06F 19/3412 713/168 |
| 2010/0169645 | A1* | 7/2010 | McGrew | H04L 9/0822 713/170 |
| 2010/0306544 | A1* | 12/2010 | Lionetti | H04L 9/083 713/171 |
| 2011/0182426 | A1* | 7/2011 | Roosta | H04L 9/0833 380/255 |
| 2012/0204032 | A1* | 8/2012 | Wilkins | H04L 9/006 713/170 |
| 2013/0054964 | A1* | 2/2013 | Messerges | H04L 9/0833 713/163 |
| 2013/0061054 | A1* | 3/2013 | Niccolai | G06F 21/10 713/171 |
| 2013/0145160 | A1* | 6/2013 | Bursell | 713/168 |
| 2013/0219035 | A1* | 8/2013 | Detienne | H04L 9/0833 709/223 |
| 2013/0259234 | A1* | 10/2013 | Acar | H04L 9/0833 380/278 |
| 2013/0293390 | A1* | 11/2013 | Le Buhan | G01D 4/004 340/870.02 |
| 2013/0294603 | A1* | 11/2013 | Lehtovirta | H04L 63/064 380/270 |
| 2014/0003608 | A1* | 1/2014 | MacMillan | H04L 9/0861 380/279 |
| 2014/0208104 | A1* | 7/2014 | Yoon | H04L 9/3073 713/168 |
| 2014/0233738 | A1* | 8/2014 | Chunduri | H04L 63/0428 380/277 |

OTHER PUBLICATIONS

Huang et al., A Distributed Key Assignment Protocol for Secure Multicast Based on Proxy Cryptography, ACM, © 2006, 1 page.*
Yugay et al., Secure and Fast Multimedia Digital Content Distribution System Based on a Partial Encryption and Group-key, IEEE, © 2008, 6 pages.*
Zhang et al., Multi-Key Leakage-Resilient Threshold Cryptography, ACM, © 2013, 10 pages.*
Liu et al., Reliable Re-encryption in Unreliable Coulds, IEEE, © 2011, 5 pages.*
Nirmala et al., Hierarchical Identity Role based proxy re-encryption scheme for cloud computing, IEEE, © 2013, 4 pages.*
International Search Report and Written Opinion in counterpart International Application No. PCT/US2014/046636, dated Mar. 2, 2015, 8 pages.

* cited by examiner

US 9,871,653 B2

SYSTEM FOR CRYPTOGRAPHIC KEY SHARING AMONG NETWORKED KEY SERVERS

TECHNICAL FIELD

The present disclosure relates to sharing of cryptographic keys among key servers over a communication network to support secure communications.

BACKGROUND

A power utility network includes a network of geographically distributed power substations. Each substation hosts a large number of intelligent electronic devices (IEDs) to monitor, control and protect power equipment in the substation. Effective monitoring requires robust, reliable secure communications between the IEDs. To that end, IEDs within a substation need to establish secure communications with each other and with IEDs in the other substations. The IEDs encrypt their communications and enable message authentication and integrity using cryptographic keys in accordance with an authentication and cryptographic policy. Conventionally, a dedicated key server may originate the cryptographic keys and distribute the keys to the IEDs across the many substations in accordance with a key management protocol, such as the Group Domain of Interpretation (GDOI) protocol. Use of a dedicated GDOI key server is relatively simple, but disadvantageously represents a single point failure, in that a failure of the dedicated key server, or interruptions in the communication links between the dedicated key server and any of the large number of IEDs, prevents dissemination of the necessary cryptographic information, and thus interrupts the secure communications. From the power safety and protection perspective, this would be unacceptable. Furthermore, individually configuring each of a large number of key servers is a management burden, may result in misconfigurations, and thus poses a security risk.

DESCRIPTION OF EXAMPLE EMBODIMENTS

Overview

A technique for key sharing among key servers connected to one another over a communication network is provided herein. Each key server generates and stores cryptographic keys, and provides the keys to a device group connected with the key server, to enable the device group to perform one or more of authenticate, encrypt, and check the integrity of messages with the keys. Each key server acts as a proxy for the other key servers in order to receive other keys from the other key servers over the network, and provide the other keys to the device group to perform one or more of authenticate, decrypt, and check the integrity of messages that were encrypted with the other keys and received from other device groups respectively connected with the other key servers.

First and second key sharing embodiments are provided. In the first key sharing embodiment, the multiple key servers share their respective keys with each other, directly, as needed to support secure communications between their respective device groups. In a second key sharing embodiment, the multiple key servers share their keys with each other indirectly through a central key server, which serves a key repository for the keys generated in the multiple key servers. In the second key sharing embodiment, the multiple key servers provide their respective keys to a central key server, which stores the keys from the multiple key servers. Then, each of the multiple key servers requests keys of the other key servers from the central key server as necessary to support secure communications between the device groups respectively connected with each of the key servers.

Example Embodiments

Figure 1:
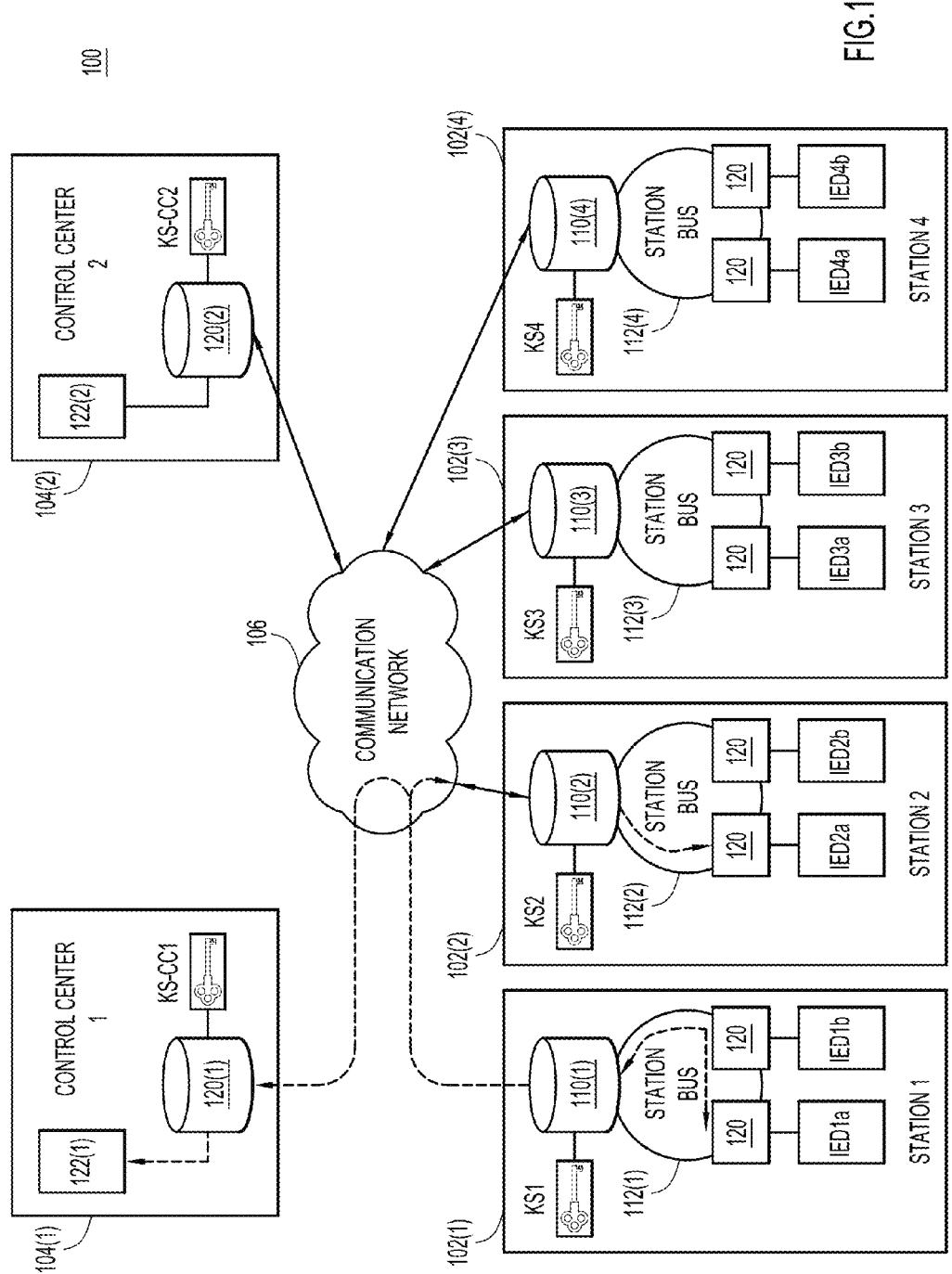
FIG. 1 is a block diagram of an example network system in which multiple key servers are configured to share cryptographic keys with one another over a communication network in support of secure one-to-one and multicast communications over the network.

Referring to FIG. 1, an example network system 100 is shown in which multiple key servers KS1-KS4 and control center key servers KS-CC1-KS-CC2 are configured to communicate cryptographic keys to one another, i.e., share keys, over a communication network in support of secure one-to-one and multicast communications over the network, as will be described below. Network system 100 is described herein in the context of a power utility network by way of example, only. Other types of network systems unrelated to power utility networks are possible, and the key sharing techniques described herein are equally applicable to such other systems.

In the power utility network example, network system 100 includes multiple substations (also referred to herein as stations) 102(1)-102(4) to monitor various aspects of a power grid, and multiple control centers 104(1)-104(2). Stations 102(1)-102(4) are also referred to herein collectively as stations 102, and individually as a/each station 102(*i*). More or less stations 102 and control centers 104 than are depicted in FIG. 1 may be employed as necessary to suit a given application. Network system 100 also includes a communication network 106 over which stations 102 and control centers 104 may communicate with each other. Communication network 106 may include private and/or public wide area networks (WANs), and may include the Internet.

Each station 102(*i*) includes a local key server KSi to generate, store, and update or refresh unique cryptographic information, i.e., one or more cryptographic keys, suitable for authenticating and encrypting messages as well as verifying message integrity originating from that station in accordance with an authentication and cryptographic policy, also stored in the key server. In an example, key server KSi generates and refreshes the cryptographic keys in accordance with the GDOI protocol; however, other cryptographic key management protocols may be used. Each station 102($i$) includes a network access point 110($i$), such as a communication switch, to act as a gateway for messages to and from communication network 106, and to communicate with key server KSi and a local network 112($i$) (referred to as a station bus or process bus), such as a local area network (LAN), within the station. Each station 102$i$ also includes a local device group including multiple intelligent electronic devices IEDia-IEDin (e.g., IED1$a$, IED1$b$, . . . IED1$n$) connected to local network 112$i$ through local network interfaces 120, such as network switches. Typically, each station 102$i$ may include hundreds, or even thousands, of IEDs. It is to be understood that in a general context, a device group can be any grouping of devices that are not necessarily grouped by location. An exemplary IED monitors and controls power equipment, and is also configured to transmit and receive messages, as will be described below.

In each station 102($i$), the IEDs of the local device group comprising IEDia-IEDin register with key server KSi over local network 112($i$). Key server KSi authenticates the registered IEDs in the local device group and then provides its generated keys and the associated authentication and cryptographic policy to the authenticated IEDs over local network 112($i$). Armed with the keys and the associated authentication and cryptographic policy, each IED in the local device group of station 102$i$ is able to authenticate, encrypt, and check the integrity of a message originating from the IED with the keys in accordance with the policy, and then transmit the encrypted message to other IEDs within the station (see, e.g., a message transmission path depicted in dotted line in station 102(1) from IED1$b$ to IED1$a$), or to IEDs in other stations (see, e.g., a message transmission path depicted in dotted line from IED1$b$ in station 102(1) to IED2$a$ in station 102(2)).

The IEDs in a local device group of a given station 102($i$) receive keys to encrypt messages only from the key server KSi, and only over the local network 112($i$) in that station. Moreover, in the example network 100 of FIG. 1, local network 112($i$) in station 102($i$) does not extend direct communication connectivity to local device groups in other stations. Therefore, the IEDs in the local device group of station 102($i$) are considered local only to key server KSi, and IEDs in device groups of stations other than station 102($i$) are considered remote with respect to station 102($i$) and key server KSi. Similarly, the IEDs in the local device groups of the other stations (not station 102($i$)) are considered local with respect to their respective key servers.

Turning to control centers 104, each control center 104($i$) includes an associated network access point 120($i$), similar to each access point 110($i$), to provide components of the control center with access to communication network 106. Each control center 104($i$) also includes a central key server KS-CCi to act as a repository to store multiple keys from multiple stations 102 (in accordance with the second key sharing embodiment described below) and an optional management server 122($i$) to control the operation of the control center and to communicate with stations 102. In the second embodiment, selected ones of central key servers KS-CC1 and KS-CC2 are designated as alternative key servers for storing the keys from multiple key servers 102, and each of the multiple key servers 102($i$) is provisioned with information identifying which of the central key servers KS-CCi has been designated as the alternative key server.

Network system 100 supports techniques for key sharing among multiple key servers KS1-KS4, and central key servers KS-CC1-KS-CC2 over communication network 106. Each key sever KSi provides its respective keys to the IEDs in its local device group over local network 112($i$), to enable the local device group to encrypt messages with the keys. Each key server KSi acts as a proxy for the other key servers among key servers KS1-KS4, to thereby receive other keys from the other key servers over communication network 106, and provide those other keys to the local device group for use thereby to authenticate, decrypt, and check the integrity of messages received from other device groups respectively connected with the other key servers that were encrypted with the other keys.

As mentioned above, network system 100 supports first and second key sharing embodiments. In the first embodiment, multiple key servers KS1-KS4 share keys with each other over network 106, directly, as needed to support secure communications between their respective local device groups. In the second key sharing embodiment, multiple key servers KS1-KS4 share their keys with each other indirectly through one or more of central key servers KS-CC1-KS-CC2, which have been designated as alternative key servers, and thereby serve as central key repositories for the keys of the multiple key servers. In the second key sharing embodiment, multiple key servers KS1-KS4 provide their respective keys to, e.g., central key server KS-CC1, which stores the keys from the multiple key servers. Then, each key server KSi requests keys of the other key servers from central key server KS-CC1 as necessary to support secure communications between the local device groups respectively connected with each of the key servers.

Figure 2:
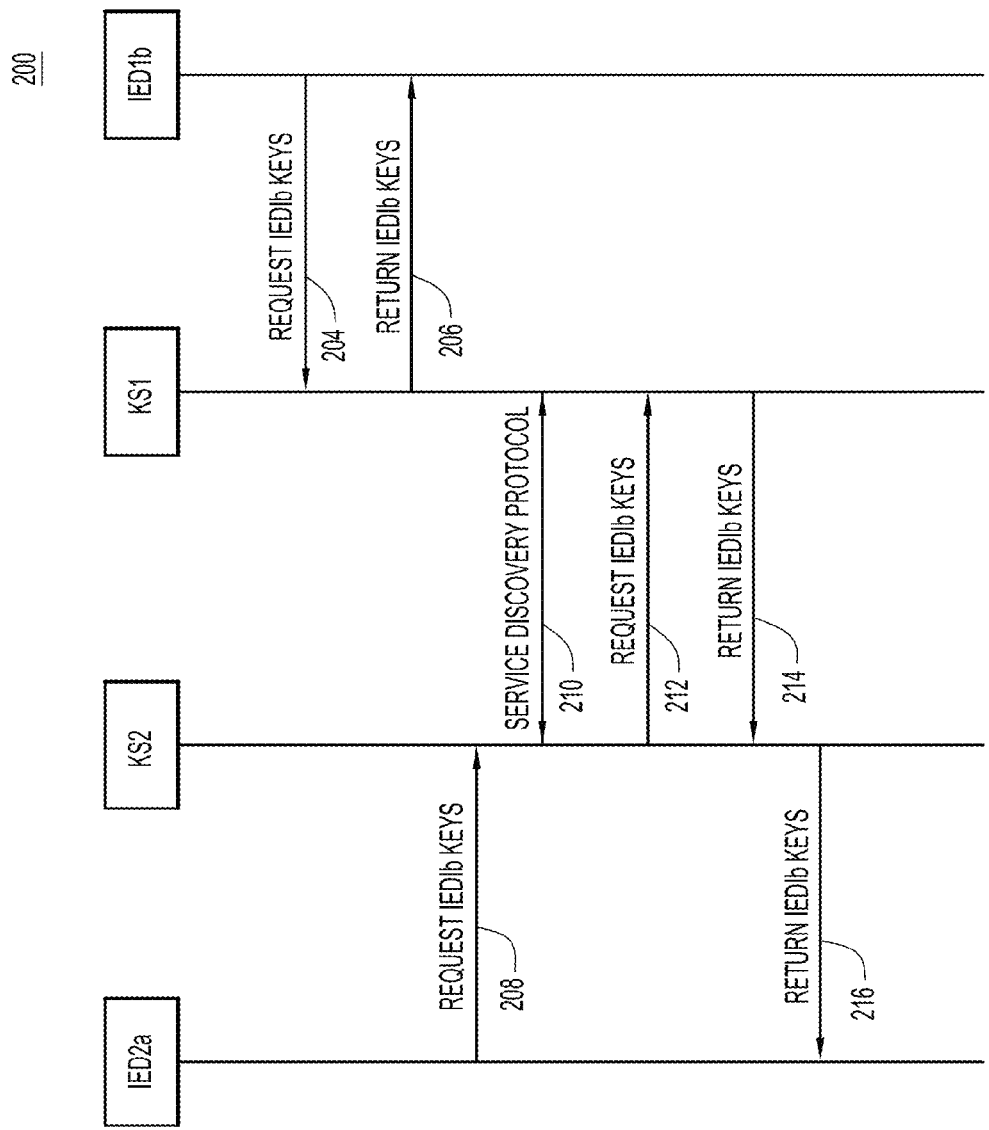
FIG. 2 is an example message exchange diagram within the network system of FIG. 1, according to a first key sharing embodiment.

Turning to FIG. 2, an example message exchange diagram 200 within system 100, according to the first key sharing embodiment, is shown. Message exchange diagram 200 assumes initially that IED2$a$ in station 102(2) needs to decrypt an encrypted message transmitted by IED1$b$ in station 102(1).

At 204, IED1$b$ requests a key from key server KS1 over local network 112(1).

At 206, key server KS1 returns the requested key, i.e., the IED1$b$ key, to IED1$b$.

IED1$b$ encrypts the message with the IED1$b$ key and transmits the encrypted message to IED2$a$ in station 102(2). The IED1$b$-to-IED2$a$ message transmission path is best seen in FIG. 1 in dotted line.

After IED2$a$ receives the encrypted message from IED1$b$, at 208, IED2$a$ requests the key needed to decrypt the received message from its local key server KS2.

At 210, key server KS2 determines which of the key servers among key servers 102 should be queried for the key needed to decrypt the message. Key server KS2 may rely on a service discovery protocol to make this determination, which returns key server KS1 as the source of the requested key.

An example service discovery protocol might be based on RFC 6763, and operate in the following manner. For each station i, its KSi is identified by a Domain Name System (DNS) record as a key server through use of a well known Instance and Service name (e.g., "_ks._gdoi.station1.utility.com"). Assume, for example, access point 110(1) is identified with a unique DNS reachable name (e.g., "station1.utility.com"), which can be found using a DNS reverse mapping from the Internet Protocol (IP) address of IED1*b*. At 208, IED2*a* requests from KS2 the key needed to decrypt messages from IED1*b*. At 210, IED2*a* looks up the DNS name of IED1*b* using a DNS reverse mapping, and from the result queries the well-known service name for the KS in that substation (e.g., "_ks._gdoi.station1.utility.com") to determine the IP address of KS1.

At 212, key server KS2 requests the necessary key, from key server KS1 determined at 210, over communication network 106.

At 214, key server KS1 returns the requested key (i.e., the IED1*b* key) to key server KS2.

At 216, key server KS2 returns the requested key received from key server KS1 to IED2*a*, and IED2*a* decrypts the received message using the key.

Figure 3:
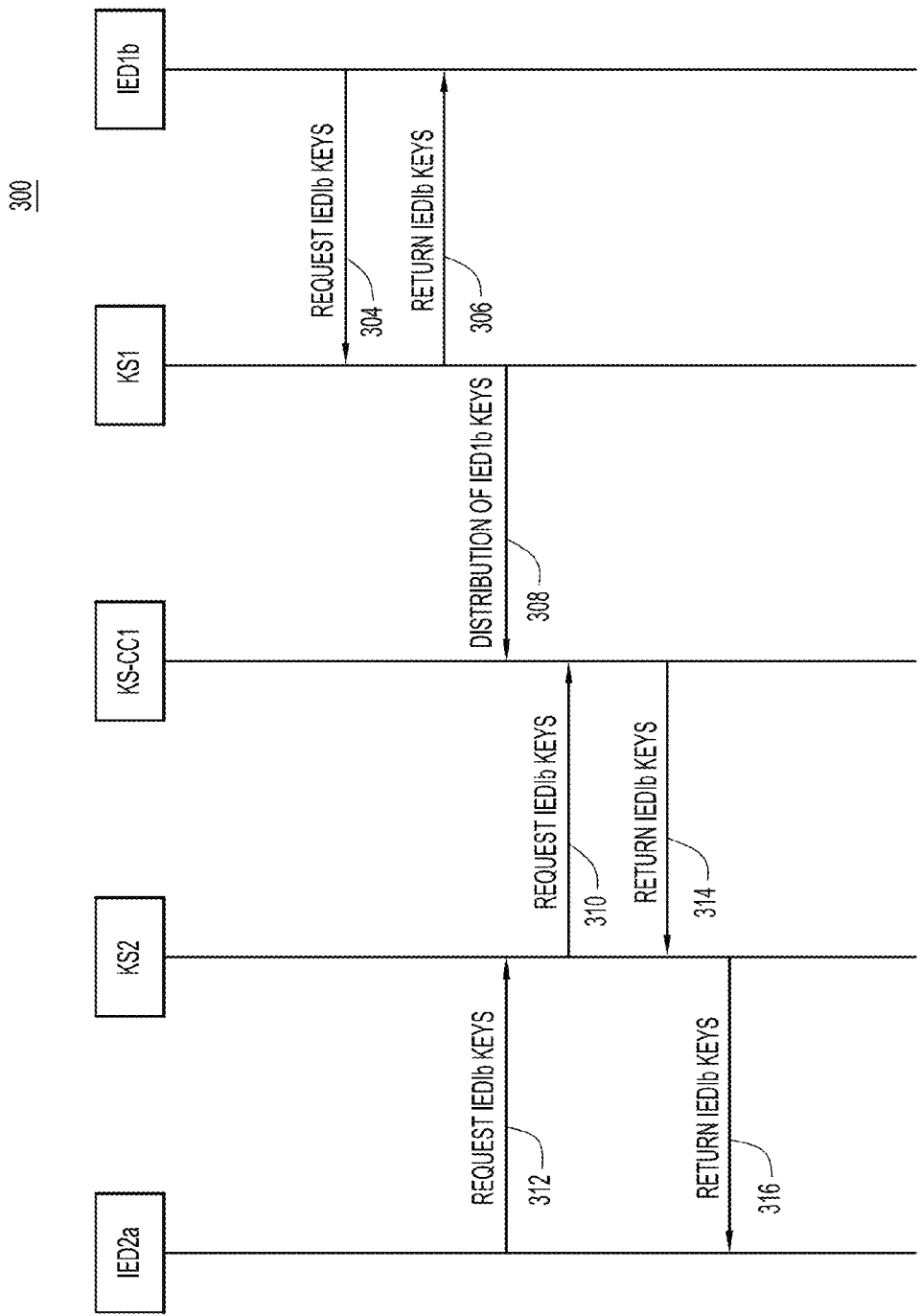
FIG. 3 is an example message exchange diagram within the network system of FIG. 1, according to a second key sharing embodiment.

Turning to FIG. 3, an example message exchange diagram 300 corresponding to the second key sharing embodiment is shown. Message thread diagram 300 assumes IED2*a* in station 102(2) needs to decrypt an encrypted message transmitted by IED1*b* in station 102(1), similar to the case described in connection with FIG. 2. It is also assumed that central key server KS-CC1 has been designated as an alternative key server for key servers KS1-KS4, and the designations have been stored in key servers KS1-KS4.

At 304, IED1*b* requests a key from key server KS1 over local network 112(1).

At 306, key server KS1 returns the requested key, the IED1*b* key, to IED1*b*.

IED1*b* encrypts the message with the IED1*b* key and transmits the encrypted message to IED2*a* in station 102(2).

At 308, key server KS1 transmits the key, i.e., the IED1*b* key to the designated alternative key server, i.e., central key server KS-CC1, for storage of the key therein (see, e.g., a key transmission path depicted in dotted line in FIG. 1 from KS1 to control center 104(1)).

At 310, key server KS2 requests the necessary key to decrypt the message from central key server KS-CC1.

When IED2*a* determines it needs keys to decrypt messages from IED1*b*, at 312 IED2*a* requests the key needed to decrypt the received message from key server KS2.

At 314, key server KS-CC1 returns the requested key, i.e., the IED1*b* key, to key server KS2.

At 316, key server KS2 returns the requested key received from central key server KS-CC1 to IED2*a*.

IED2*a* then decrypts the received encrypted message using the key returned by key server KS2.

Figure 4:
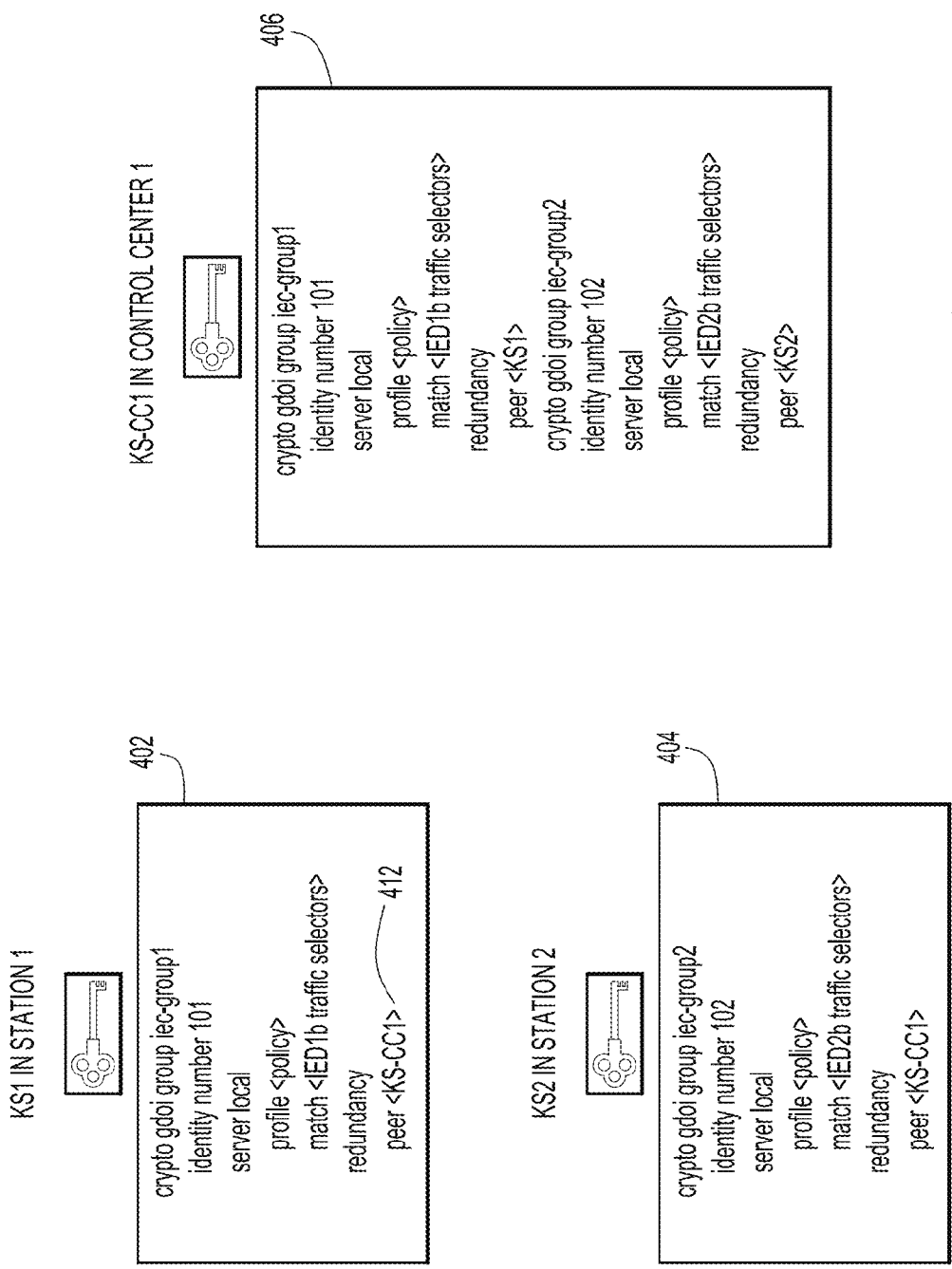
FIG. 4 is a diagram of example cryptographic key sharing information data structures stored in key severs, according to the second key sharing embodiment.

With reference to FIG. 4, example cryptographic key sharing information data structures 402, 404, and 406 stored in key severs KS1, KS2, and KS-CC1 are shown in connection with the second key sharing embodiment. Data structure 402 in key server KS1 of station 102(1) specifies a GDOI group iec-group1 (i.e., local device group) for the IEDs in station 201(1), an identity number 101, an authentication and cryptographic policy to be applied "policy," communication state information "IED1*b* traffic selectors," and a pointer 412 to the repository/source (namely, key server KS-CC1) for cryptographic keys for other device groups in network 100.

Data structure 404 includes information similar to that of 402, but with respect to key server KS2 in station 102(2), which includes a GDOI group iec-group2 for the IEDs in station 201(2).

In the second key sharing embodiment, key servers KS1 and KS2 transmit information from respective data structures 402 and 404 to central key server KS-CC1. Central key server KS-CC1 stores the information in data structure 406, and returns the information in data structure 406 in response to requests for the information from the key servers KS1 and KS2, for example, as described above in connection with FIG. 3.

Figure 5:
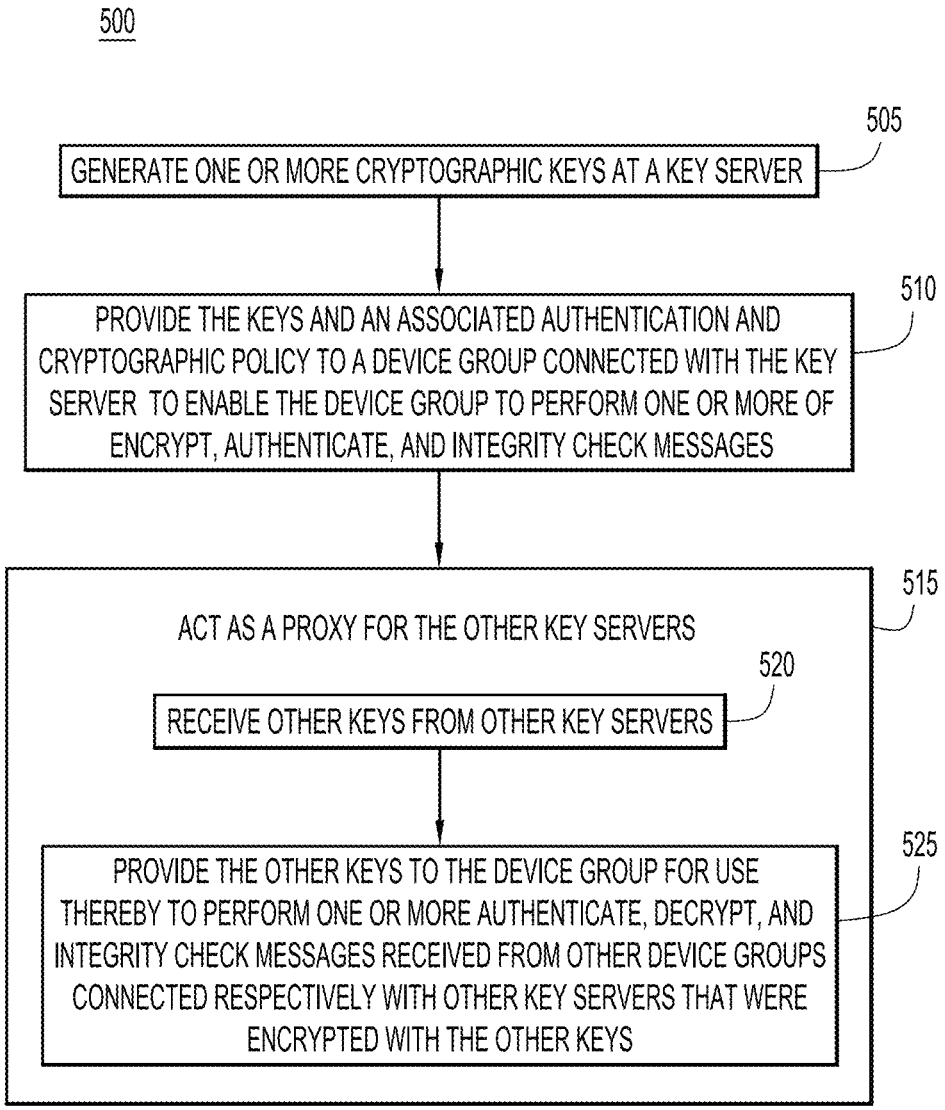
FIG. 5 is a flowchart of an example overview method of key sharing in the network system of FIG. 1, which encompasses both the first and second key sharing embodiments.

FIG. 5 is a flowchart of an example method 500 of key sharing in network system 100. Method 500 is generalized to encompass both the first and second key sharing embodiments. Operations of method 500 may be performed by each of the multiple key servers KS1-KS4, and central key servers KS-CC1-KS-CC3, as appropriate.

At 505, each key server 102(*i*) generates one or more cryptographic keys.

At 510, each key server 102(*i*) provides the keys and an associated authentication and cryptographic policy to a local device group connected with the key server, e.g., over a local area network served by the key server. The key enables communication devices in the device group to perform one or more of authenticate, encrypt, and check the integrity of messages.

At 515, key servers 102(*i*) share their respective keys with each other as necessary to enable secure communications between stations 102. That is, at 515, each key server 102(*i*) acts as a proxy for the other key servers among key servers 102. To act as a proxy for the other key servers, at 520, key server 102(*i*) receives other keys from the other key servers over communication network 106. Then, at 525, key server 102(*i*) provides the other keys to the device group connected to the key server for use by the device group to perform one or more of authenticate, decrypt, and check the integrity of messages received from other local device groups connected respectively with other key servers that were encrypted with the other keys.

Figure 6:
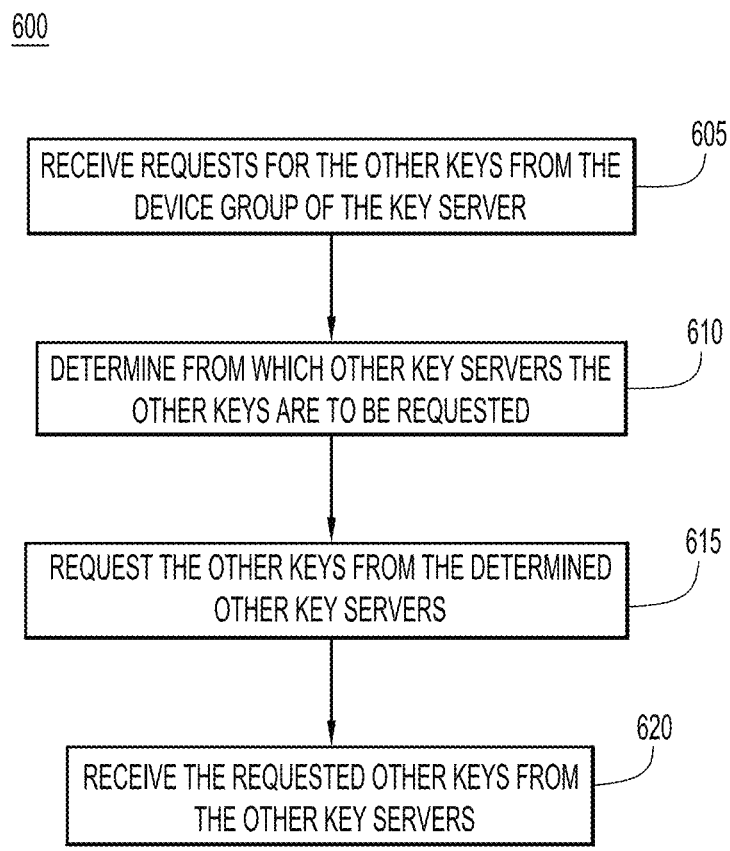
FIG. 6 is a flowchart of an example method expanding on key server proxy operations from the method of FIG. 5, according to the first key sharing embodiment.

FIG. 6 is a flowchart of a method 600 expanding on proxy operation 515 from method 500, according to the first key sharing embodiment.

At 605, key server 102(*i*) receives requests for the other keys from the device group of the key server.

At 610, key server 102(*i*) determines from which other key servers the other keys is/are to be requested, using e.g., a service discovery protocol.

At 615, key server 102(*i*) requests the other keys from the determined other key servers.

At 620, the determined other key servers return the requested keys to key server 102(*i*), which then provides the returned keys to the local group of devices (see operation 525 in FIG. 5).

Figure 7:
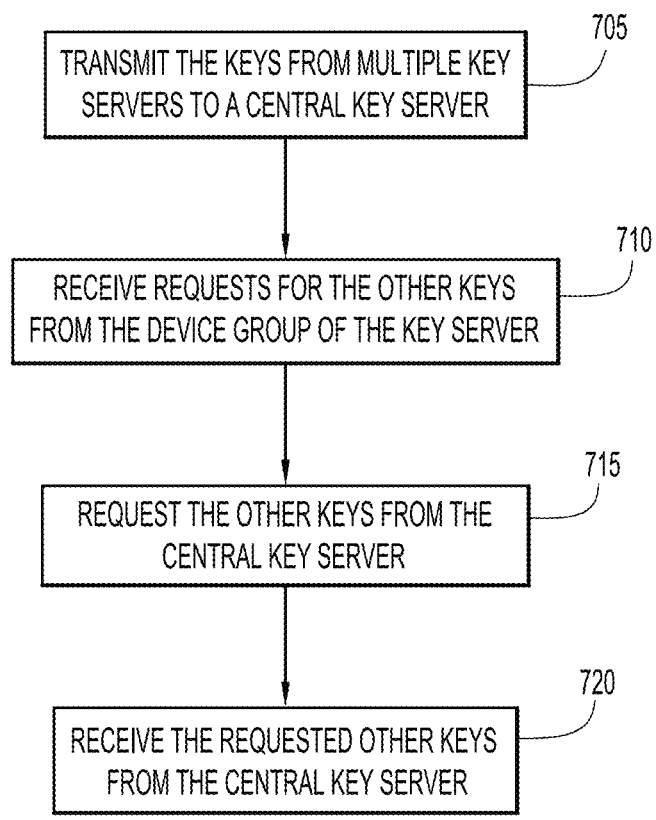
FIG. 7 is a flowchart of an example method expanding on key server proxy operations from the method of FIG. 5, according to the second key sharing embodiment.

FIG. 7 is a flowchart of a method 700 expanding on proxy operation 515 from method 500, according to the second key sharing embodiment.

At 705, key servers 102 transmit their respective keys to a central key server, e.g., key server KS-CC2. The central key server stores the multiple received keys.

At 710, key server 102(*i*) receives requests for the other keys from the device group connected with the key server.

At 715, key server 102(*i*) requests the other keys from the central key server.

At 720, the central key server returns the requested keys key server 102(*i*), which then provides the returned keys to the local group of devices (see operation 525 in FIG. 5).

Figure 8:
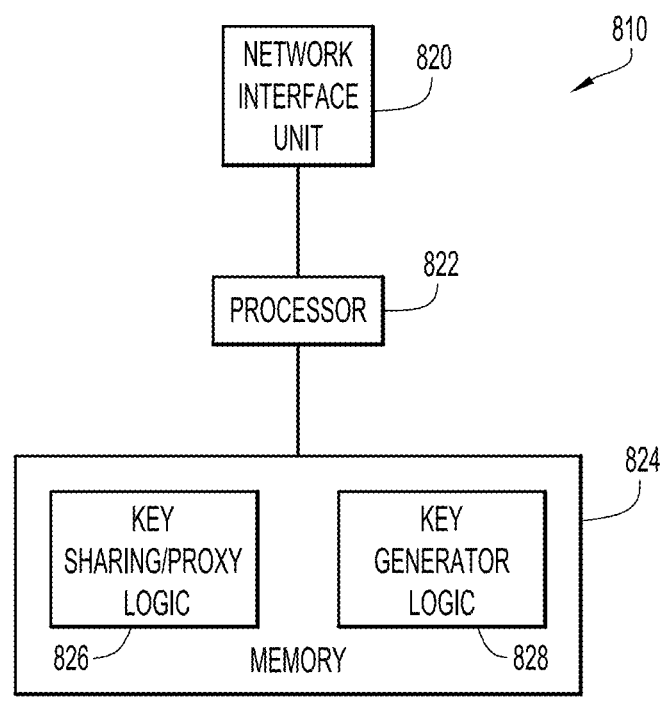
FIG. 8 is a block diagram of an example of key server configured to perform key sharing techniques.

Turning now to FIG. 8, a block diagram of an example key server 810 configured to perform key sharing in accordance with techniques described herein is shown. Key server 810 can be implemented using one or more network routers; however other devices may also be configured to perform the key server functions described herein. Key server 810 can also be a pure computational element and not configured to forward packets in the network. Generally, key server 810 comprises at least a network interface unit 820, a processor 822, and a memory 824. Processor 822 is, for example, a microprocessor, a microcontroller, a digital signal processor, etc. Network interface unit 820 is a device, e.g., Ethernet card or module, configured to enable communications over a network according to any of a variety of networking protocols.

Memory 824 is a tangible processor-readable or computer-readable memory that stores or is encoded with instructions that, when executed by processor 822, cause processor 822 to perform the functions described herein. For example, memory 824 is encoded with key sharing/proxy logic 826 and key generator logic 828 to perform method described herein, including the methods described in connection with FIGS. 5, 6, and 7. While FIG. 8 shows a processing environment comprising a data processor 822 that executes software stored in memory 824, an alternative processing environment is a fixed data processing element, such as an application specific integrated circuit (ASIC) that is configured, through fixed hardware logic, to perform the functions of the logic 826 and 828. Yet another possible data processing environment is one involving one or more field programmable logic devices, or a combination of fixed processing elements and programmable logic devices. In one form, logic 826 and 828 may be embodied in a processor-readable medium that is encoded with instructions for execution by a processor that, when executed by the processor, operate to cause the processor to perform the functions described herein in connection with logic 826 and 828.

Techniques related to secure communications between communicating devices and key sharing between key servers have been described above in the context of a power utility network. However, such techniques are equally applicable to other contexts. For example, the devices in the local device groups may be virtually any type of electronic equipment suitable for transmitting or receiving content, including but not limited to: data signals, audio/voice signals, video or visual display signals, and any other types of media or content. Any one or combination of network media such as wire, cable, optical fiber, wireless link, satellite, etc. can be used to network the devices in the local device group.

The key server key sharing techniques described herein provide robust, reliable secure communications between communicating devices, e.g., IEDs, which rely on the keys, and advantageously reduce or eliminate the single-point-failure often experienced with conventional systems that rely on dedicated key servers. The key sharing techniques leverage communications among networked key servers so that any given communicating device need only be aware of, i.e., communicate with, a local key server for any necessary keys, even if the communicating device requires keys from another key server. Such reliance on only a local key server enhances station modularity, and thus the ability to construct networks including thousands of stations.

In summary, in one form, an apparatus is provided, comprising: a network interface unit configured to enable communications over a network; and a processor coupled to the network interface unit, and configured to: store cryptographic keys on behalf of a key server; provide the cryptographic keys to a device group including multiple devices connected with the key server, to enable the device group to encrypt messages with the keys; and act as a proxy for other key servers in order to receive other keys from the other key servers over the network, and provide the other keys to the device group to decrypt messages that were encrypted with the other keys and received from other device groups respectively connected with the other key servers.

In another form, a method is provided, comprising: at a key server connected to a network: storing cryptographic keys on behalf of the key server; providing the keys to a device group including multiple devices connected with the key server, to enable the device group to encrypt messages with the keys; and acting as a proxy for other key servers, wherein acting as a proxy includes: receiving other keys from the other key servers over the network; and providing the other keys to the device group to decrypt messages that were encrypted with the other keys and received from other device groups respectively connected with the other key servers.

In still another form, a computer readable tangible storage media is provided. The computer readable tangible storage media is encoded with instructions that, when executed by a processor of a key server, cause the key server to: store cryptographic keys; provide the keys to a device group including multiple devices connected with the key server, to enable the device group to encrypt messages with the keys; and act as a proxy for other key servers in order to receive other keys from other key servers over a network, and provide the other keys to the device group to decrypt messages that were encrypted with the other keys and received from other device groups respectively connected with the other key servers.

In yet another form, a method is provided, comprising: at each of multiple key servers connected to a network: storing respective cryptographic keys on behalf of a key server; providing the respective keys to a device group including multiple devices connected with the key server, to enable the device group to encrypt messages with the keys; and acting as a proxy for the other key servers, including: receiving other keys from the other key servers over the network, and providing the other keys to the device group to decrypt messages that were encrypted with the other keys and received from other device groups respectively connected with the other key servers.

In another form, a system is provided, comprising: multiple key servers connected to a network, each configured to: store respective cryptographic keys; provide the respective keys to a device group including multiple devices connected with the key server, to enable the device group to encrypt messages with the keys; and act as a proxy for the other key servers, to receive other keys from the other key servers over the network, and provide the other keys to the device group for use to decrypt messages received from other device groups respectively connected with the other key servers that were encrypted with the other keys. The device group may be further configured to: authenticate and integrity check the messages with the keys; and authenticate and integrity check the messages received from the other device group with the other keys.

The system may further comprise a central key server connected to the network, wherein the multiple key servers are configured to transmit the respective keys to the central key server for storage therein, wherein each of the multiple key servers configured to act as a proxy is further configured to: request the other keys to decrypt the received encrypted messages from the central key server over the network; and receive the requested other keys from the central key server over the network.

Each of the multiple key servers configured to act as a proxy may be configured to request the other keys in response to requests for the other keys from the device group. Each of the multiple key servers configured to act as a proxy may be further configured to: determine which other key servers are to be requested for keys based on a service discovery protocol; request the other keys to decrypt the received encrypted messages from the determined other key servers over the network; and receive the requested other keys from the other key servers over the network. Each of the multiple key servers configured to act as a proxy may be configured to request the other keys in response to requests for the other keys from the device group.

Each of the multiple key servers may be further configured to: store a respective authentication and cryptographic policy associated with the respective keys; and provide the policy to the device group for use by the device group to encrypt messages in accordance with the policy, wherein each of the multiple key servers configured to act a proxy is further configured to receive the other keys together with the associated authentication and cryptographic policy and provide the policy to the device group for use to decrypt the messages from the other device groups respectively connected with the other key servers.

The system may further comprise multiple power utility substations, each including a respective one of the multiple key servers and the device group connected with the respective keys, wherein the device group includes controller-based sensors to monitor power devices. Each of the multiple key servers may be further configured to generate and refresh the respective keys that the key server is configured to provide to the device group connected with the key server.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. An apparatus comprising:
    a network interface configured to enable communications over one or more networks; and
    a processor of a key server coupled to the network interface and a memory encoded with instructions that, when executed by the processor, cause the processor to:
    store cryptographic keys and an associated authentication and cryptographic policy on behalf of the key server;
    provide the cryptographic keys and the associated authentication and cryptographic policy to a device group including multiple devices connected with the key server over a local area network, to enable the device group to encrypt messages with the keys, wherein the device group is configured to:
        authenticate and integrity check the messages with the keys; and
        authenticate and integrity check the messages received from other device groups with other keys; and
    act as a proxy for other key servers, including:
        determining the other key servers from which the other keys are to be requested based on a service discovery protocol;
        requesting the other keys to decrypt encrypted messages from the determined other key servers over a wide area network, the encrypted messages encrypted with the other keys and received from other device groups respectively connected with the other key servers over respective local area networks;
        receiving the other keys together with respective associated authentication and cryptographic policies from the other key servers over the wide area network; and
        providing the other keys and associated authentication and cryptographic policies to the device group over the local area network to decrypt the encrypted messages.

2. The apparatus of claim 1, wherein the processor is further configured to request the other keys in response to requests for the other keys from the device group.

3. The apparatus of claim 1, further comprising a power utility substation including the key server and the device group connected with the key server, wherein the device group includes controller-based sensors to monitor power devices.

4. The apparatus of claim 1, wherein the processor is further configured to generate and refresh the keys that are provided to the device group connected with the key server.

5. The apparatus of claim 1, wherein the processor is further configured to store a data structure specifying the device group, an identity number, the authentication and cryptographic policy, and communication state information.

6. A method comprising:
    at a key server connected to one or more networks:
        storing cryptographic keys and an associated authentication and cryptographic policy on behalf of the key server;
        providing the keys and the associated authentication and cryptographic policy to a device group including multiple devices connected with the key server over a local area network, to enable the device group to encrypt messages with the keys, wherein the device group is configured to:
            authenticate and integrity check messages with the keys; and
            authenticate and integrity check messages received from other device groups with other keys; and
        acting as a proxy for other key servers, wherein acting as a proxy includes:
            determining the other key servers from which the other keys are to be requested based on a service discovery protocol;
            requesting the other keys to decrypt encrypted messages from the other key servers over a wide area network, the encrypted messages encrypted with the other keys and received from other device groups respectively connected with the other key servers over respective local area networks;
            receiving the other keys together with respective associated authentication and cryptographic policies from the other key servers over the wide area network; and
            providing the other keys and the associated authentication and cryptographic policies to the device group over the local area network to decrypt the encrypted messages.

7. The method of claim 6, further comprising, at the key server, generating and refreshing the keys that are provided to the device group connected with the key server.

8. The method of claim 6, further comprising storing a data structure that specifies the device group, an identity number, the authentication and cryptographic policy, and communication state information.

9. The method of claim 6, further comprising:
    requesting the other keys in response to requests for the other keys from the device group.

10. The method of claim 6, wherein a power utility substation includes the key server and the device group connected with the key server, and wherein the device group includes controller-based sensors to monitor power devices.

11. A non-transitory computer readable storage medium encoded with instructions that, when executed by a processor of a key server, cause the key server to:
store cryptographic keys and an associated authentication and cryptographic policy on behalf of the key server;
provide the keys and the associated authentication and cryptographic policy to a device group including multiple devices connected with the key server over a local area network, to enable the device group to encrypt messages with the keys, wherein the device group is configured to:
authenticate and integrity check messages with the keys; and
authenticate and integrity check messages received from other device groups with other keys; and
act as a proxy for other key servers, wherein acting as a proxy includes:
determining the other key servers from which the other keys are to be requested based on a service discovery protocol;
requesting the other keys to decrypt encrypted messages from the other key servers over a wide area network, the encrypted messages encrypted with the other keys and received from other device groups respectively connected with the other key servers over respective local area networks;
receiving the other keys together with respective associated authentication and cryptographic policies from the other key servers over the wide area network; and
providing the other keys and the associated authentication and cryptographic policies to the device group over the local area network to decrypt the encrypted messages.

12. The non-transitory computer readable storage medium of claim 11, further comprising instructions to cause the key server to store a data structure that specifies the device group, an identity number, the authentication and cryptographic policy, and communication state information.

13. The non-transitory computer readable storage medium of claim 11, wherein the instructions further cause the key server to request the other keys in response to requests for the other keys from the device group.

14. The non-transitory computer readable storage medium of claim 11, wherein a power utility substation includes the key server and the device group connected with the key server, and wherein the device group includes controller-based sensors to monitor power devices.

15. The non-transitory computer readable storage medium of claim 11, wherein the instructions further cause the key server to generate and refresh the keys that are provided to the device group connected with the key server.

16. A method comprising:
at a key server connected to one or more networks:
storing cryptographic keys on behalf of the key server;
providing the keys and an associated authentication and cryptographic policy to a device group including multiple devices connected with the key server over a local area network, to enable the device group to encrypt messages with the keys, wherein the device group is configured to:
authenticate and integrity check messages with the keys; and
authenticate and integrity check messages received from other device groups with other keys;
transmitting the keys and the associated authentication and cryptographic policy over the wide area network to a central key server for storage therein along with other keys and respective associated authentication and cryptographic policies transmitted from other key servers to the central key server; and
acting as a proxy for the other key servers, wherein acting as a proxy includes:
requesting the other keys to decrypt encrypted messages from the central key server over a wide area network, the encrypted messages encrypted with the other keys and received from other device groups respectively connected with the other key servers over respective local area networks;
receiving the other keys and the associated authentication and cryptographic policies for the other key servers from the central key server over the wide area network; and
providing the other keys and the associated authentication and cryptographic policies over the local area network to the device group to decrypt the encrypted messages.

17. The method of claim 16, further comprising storing, on the key server, a data structure that specifies the device group, an identity number, communication state information, and a pointer to the central key server connected to the wide area network.

18. The method of claim 16, further comprising storing, on the central key server, a data structure specifying the device group, the authentication and cryptographic policy associated with the key server, and the device groups and the authentication and cryptographic policies associated with the other key servers.

* * * * *